United States Patent [19]
Gessner

[11] 3,930,814
[45] Jan. 6, 1976

[54] PROCESS FOR PRODUCING OXYGEN-ENRICHED GAS
[75] Inventor: David M. Gessner, Worcester, Mass.
[73] Assignee: General Electric Company, Milwaukee, Wis.
[22] Filed: Nov. 27, 1974
[21] Appl. No.: 527,738

[52] U.S. Cl. .............................. 55/16; 55/21; 55/68
[51] Int. Cl.² ......................................... B01D 53/22
[58] Field of Search ................... 55/16, 21, 68, 158

[56] References Cited
UNITED STATES PATENTS
2,609,059  9/1952  Benedict ................................. 55/16
3,256,675  6/1966  Robb ...................................... 55/16
3,771,365  11/1973  Schempp ............................ 55/21 X Primary Examiner—John Adee
Attorney, Agent, or Firm—Thomas J. Bird, Jr.; Granville M. Pine; Edward A. Hedman

[57] ABSTRACT

Membrane permeation processes to produce oxygen-enriched gas from atmospheric air are improved by feeding the air to membrane cells divided into two groups, independently withdrawing the permeate output from the two groups of cells into two conduits containing restrictions, and referencing the pressure of one output against the other. A subsequent imbalance of pressure between the two permeate outputs indicates a membrane leakage in one of the two groups of cells.

10 Claims, 3 Drawing Figures

PROCESS FOR PRODUCING OXYGEN-ENRICHED GAS

The present invention relates to a process for gas separation by means of permeable membranes, and more specifically to an improved process for enriching atmospheric air with oxygen, in which membrane leakage failures are readily determined.

BACKGROUND OF THE INVENTION

In the treatment of patients suffering respiratory ailments, such as emphysema where the patient's lung capacity is severely restricted, it is common practice to provide the patient with a source of oxygen enriched gas. Typically, this source of oxygen enriched gas is provided from a pressurized oxygen cylinder which may be located remotely from the patient in a hospital and supplied through suitable tubing (central storage type) or may be an individual cylinder located at the patient's bedside. Since many of these ailments are chronic and require extended therapy, portable oxygen cylinders which the patient may use at home have been developed.

While the use of individual cylinders provides the necessary life-sustaining therapy for these patients, the cylinders themselves present several problems when used in the home. Specifically, since these cylinders contain enriched oxygen gas, they present a constant danger of fire and explosion during use. The individual cylinders have limited capacity, and therefore must be serviced and replaced routinely thereby increasing the cost of therapy. In addition, there may also be leakage problems which may undetectedly diminish the capacity of a cylinder so that the patient is left with inadequate therapy gas.

Atmostpheric air, which contains about 20% oxygen and 78% nitrogen, provides a vast and abundant source of oxygen. However, until recently technology for extrating oxygen economically for individual use has been lacking. With the development of thin permselective membranes, such as those of plastics, such as silicone rubber, polyphenylene ethers and the like, and associate systems technology, feasible separation of gases has been achieved.

The separation of gases in such membrane systems technology is based on the selective permeability of certain materials. The term "selective permeability" means that one gas in a mixture will permeate through a membrane faster than a second gas, but this is not to suggest that one gas passes through the membrane to the complete exclusion of all others. Rather, a difference in the flow rate of two molecular species through a permeable membrane results so that the gas mixture on one side of the membrane is depleted in concentration of the more permeable component and the gas on the opposite side of the membrane is enriched with the more permeable component.

The oxygen-enricher systems associated with the membranes can comprise (i) those adapted to receive and compress atmospheric air before feeding compressed such air to the membranes for separation; and (ii) those in which the atmospheric air is fed to the membranes at ambient pressures and the oxygen enriched air, the so-called "permeate output" is drawn off under a partial vacuum.

In either case, to provide the highest efficiency as well as the most compact design, the membranes in oxygen enrichers are usually mounted on frames, to form envelope-like cells, and a plurality of such cells are arranged into layer-like stacks or arrays. It is important in all such systems to carry out the process with membranes that are leak-free, because air passing through leaking systems is obviously not efficiently enriched in oxygen, causing at best a reduced degree of oxygen enrichment and, at the worst, aggravation of the patient's condition due to no enrichment of the prescribed oxygen at all.

Previously, membrane leakage was determined by using an oxygen sensor in the extract line, or a valve to set up a reference flow to which the enriched air flow was compared. Neither method was entirely satisfactory, the former because frequent standardization was required, and the latter because the technique did not readily compensate for variations in stack output due to fluctuations in pressure, temperature and increasing age of the membranes.

The present invention is based on the discovery that if the membrane array is divided into two groups, or stacks, one can be used as an internal reference and membrane leakage is readily determined by pressure changes. The major advantages of this discovery are that there is no longer any need for an oxygen sensor; and that there is automatic compensation for variations in pressure, temperature, increasing age of the membranes, and changes in the ratio of permeate flow to feed flow.

SUMMARY OF THE INVENTION

According to the present invention, in a membrane permeation process to produce oxygen enriched gas from atmospheric air comprising delivering a flow of atmospheric air to an array of series flow, selectively permeable membrane cells having a greater permeability of oxygen relative to nitrogen and maintaining a pressure differential across said array to produce an oxygen enriched permeate therethrough, there is provided an improvement comprising:
 i. dividing the selectively permeable membrane into two groups of cells;
 ii. independently collecting the oxygen-enriched permeate output from each of the groups of cells;
 iii. passing each collected permeate output through independent conduit means including means for restricting the flow of the oxygen enriched permeate output to initially produce zero pressure differential between each conduit means, the pressure being measured in each conduit means at a location upstream of the flow restricting means;
 iv. continuously determining the presence or absence of a pressure differential between the conduit means; and
 v. discontinuing the process when a pressure differential is determined to exist between the conduit means indicating a membrane leakage failure in one of the two groups of membrane cells.

A preferred feature of the invention will include the step of measuring the pressure differential across one of the restrictions whereby the total oxygen enriched permeate flow delivered in the process is determined.

Another preferred feature of the invention is to use a system in which the array comprises at least four cells and the two groups are provided by dividing alternate cells.

In preferred embodiments, the process will be carried out in an apparatus in which the restricting means is adjustable and the initial production of zero pressure differential between each conduit means is achieved by adjusting the respective restricting means.

As has been mentioned, the invention can be used with both pressure- and vacuum- enriching systems. Thus, one preferred feature will comprise a process, as above defined, including the steps of compressing the atmospheric air and delivering it to the array of cells in a compressed state. And a second preferred feature will comprise a process, as above defined, including the steps of delivering the atmospheric air to the array of cells at substantially ambient pressure and maintaining a partial vacuum within the cells for independently collecting the oxygen-enriched permeate for transfer into the independent conduit means.

In preferred embodiments, the present invention will be carried out in systems adapted to provide oxygen-enriched gas having about 40% oxygen; those in which the cell membranes are formed of a polyphenylene ether, e.g., poly(2,6-dimethyl-1,4-phenylene)ether, preferably of about 1000 Angstrom membrane thickness; and those adapted to deliver oxygen-enriched permeate for further use at a rate in the range of about 4 to 8 liters per minute.

BRIEF DESCRIPTION OF THE DRAWINGS

Understanding of the invention is facilitated by reference to the drawings in which.

DETAILED DESCRIPTION OF THE INVENTION

Figure 1:
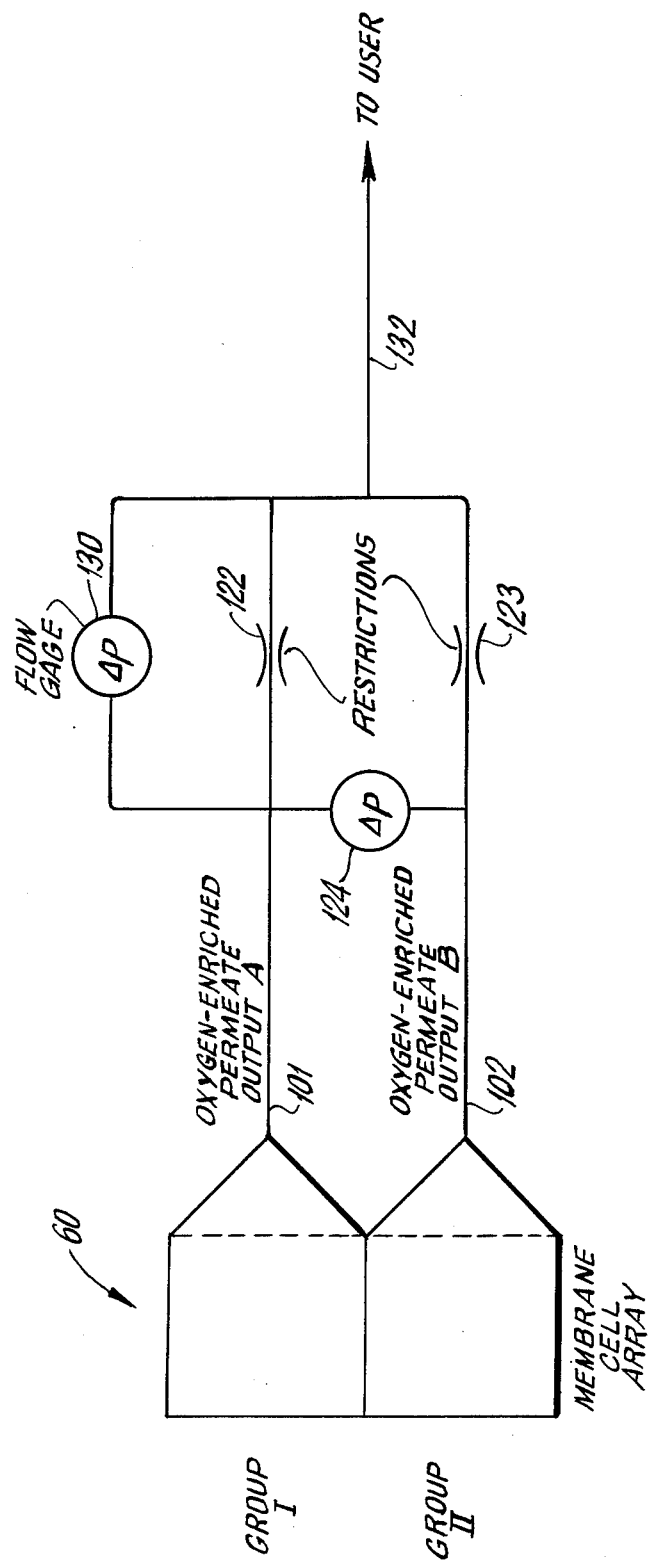
FIG. 1 illustrates, in flow diagram form, the splitting of permeate outputs according to the present invention.

While this invention is susceptible of embodiment in many different forms, there is shown in the drawings and will hereinafter be described in detail a system in which a preferred embodiment may be carried out, and modifications thereof, with the understanding that the present disclosure is to be considered as an exemplification of the principles of the invention and is not intended to limit the invention to the embodiments illustrated.

Referring to FIG. 1, membrane cell array 60 is shown split into two groups, designated I and II, and the oxygen enriched permeate, or extract, outputs from each group is separately manifolded into respective conduit means 101 and 102, each of which contains flow restrictions 122 and 123 (typically of the order of 1 psi full flow). In practice, it is simplest to divide the membrane array by manifolding alternating cells (FIG. 2), but this is not essential. For convenience, conduits 101 and 102 are united and brought out to the user through conduit 132, which may terminate in a hose nipple, face mask, nebulizer, and other well known accessories. Differential pressure measuring means 124, e.g., a guage or manometer or "U"-tube filled with liquid, and the like is connected between the two permeate conduits 101 and 102 upstream of restrictions 122 and 123, which can be orifices, chokes, needle valves, and the like. Preferably, at least one, or both, of restrictions 122 and 123 are adjustable. In optional, but preferred, embodiments, a second measuring means 130, e.g., a flow gauge, or the like, is connected across one of the restrictions (in this case 122) to provide a measurement of oxygen-enriched permeate flow. In operation, atmospheric air is directd over the cells in a conventional fashion and the oxygen enriched permeate therethrough passes through for collection in the manifolded conduits. Initially, restrictions 122 and 123 are matched to the particular membrane array group characteristics, either by selecting properly sized orifices or, more preferably, by using adjustable restrictions, e.g., tubing with screw clamps or needle valves, matching being reached when indicating means 124 is at a null position, indicating zero pressure differential. Operation is continued as long as there is a zero pressure differential between conduits 101 and 102. Should a membrane leak occur, it will show up as a deflection on indicating means 124 and operation should be discontinued to locate and correct the malfunction. The more serious the leak, the greater the indicator reading of imbalance will be. However, because the entire cell array 60 is at the same pressure and temperature, variation of the parameters will have no undue effect on indicator means 124. Of course, if two matching membrane leakage failures occur simultaneously, the pressure differential will remain zero. However, such simultaneous failure is extremely unlikely statistically.

Figure 2:
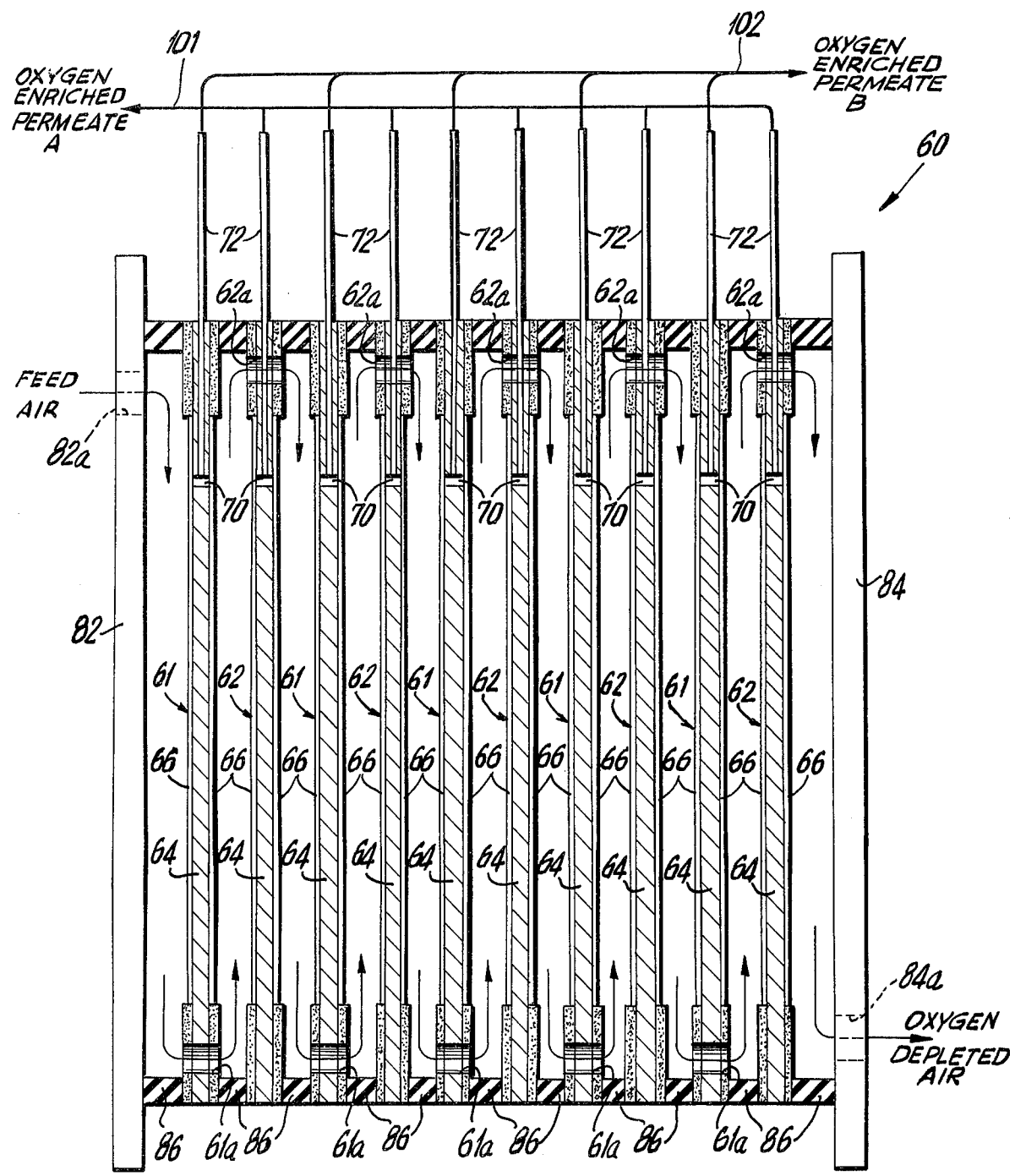
FIG. 2 illustrates in schematic, cross-sectional form a typical membrane cell array split or divided into two groups, or stacks, as contemplated by the invention.

To facilitate understanding, reference is made to FIG. 2 which shows a membrane cell array in which two groups of five cells each in series are divided by manifolding to provide two oxygen enriched permeates (A and B) suitable for feeding independent conduit means 101 and 102 according to this invention. Array 60 includes two groups of cells 61 and 62. Each cell includes a substrate 64 which is generally rectangular in shape. Selectively permeable membranes 66, which may also include a porous backing material are positioned on the major surfaces of each substrate. Membranes 66 are also rectangular in shape but smaller in dimensions than substrate 64 to provide an exposed peripheral portion of the substrate when the membranes are attached thereto in conventional manner, e.g., by tape or other suitable means (not shown), which overlies the periphery of the membrane and the exposed portions of the substrate. Each substrate defines a central passageway 70 extending transversely between the major surfaces thereof so that enriched gas may be drawn off therethrough from the interface between the membranes and substrate. Extending upwardly from passage 70 is a tube 72 carried within a bore in each substrate. Each tube 72 is suitably connected to independent manifolds terminating in conduits 101 and 102. In this manner, oxygen enriched permeate is collected in the manifolds and directed to the control system, described above.

With further reference to FIG. 2, membrane cells 61 and 62 are in sealing engagement with two end plates 82 and 84 by means of gaskets 86 which extend around the periphery of each cell. End plates 82 and 84 and cells 61 and 62 are maintained in sealing engagement with the gaskets through clamping means such as bolts (not shown). End plate 82 includes an air inlet port 82a adjacent the upper end of the array through which air enters the stack. Substrate 64 of each cell 61 includes a flow port 61a at its lower end so that air entering port 82a flows downwardly along the left hand membrane 66 on cell 61 through port 61a and upwardly between cells 61 and 62. Substrate 64 of cell 62 also includes a flow port 62a located at the upper end thereof to provide a cross-over flow port for compressed air to flow downwardly along the right hand membrane of cell 62. End plate 84 includes an exhaust port 84a at the lower end thereof which delivers the oxygen depleted air or raffinate to an exhaust conduit (not shown) which passes out of the system.

Membrane 66 may be of several types, including silicone rubber and polyphenylene ether. Since the present invention is designed for use of a source of enriched oxygen for inhalation therapy, the oxygen enriched gas should contain 40% oxygen. For this level of enrichment membranes of polyphenylene ether are preferred. Preferably, each membrane cell has a permeation thickness in the order of about 1000 Angstroms or less.

Figure 3:
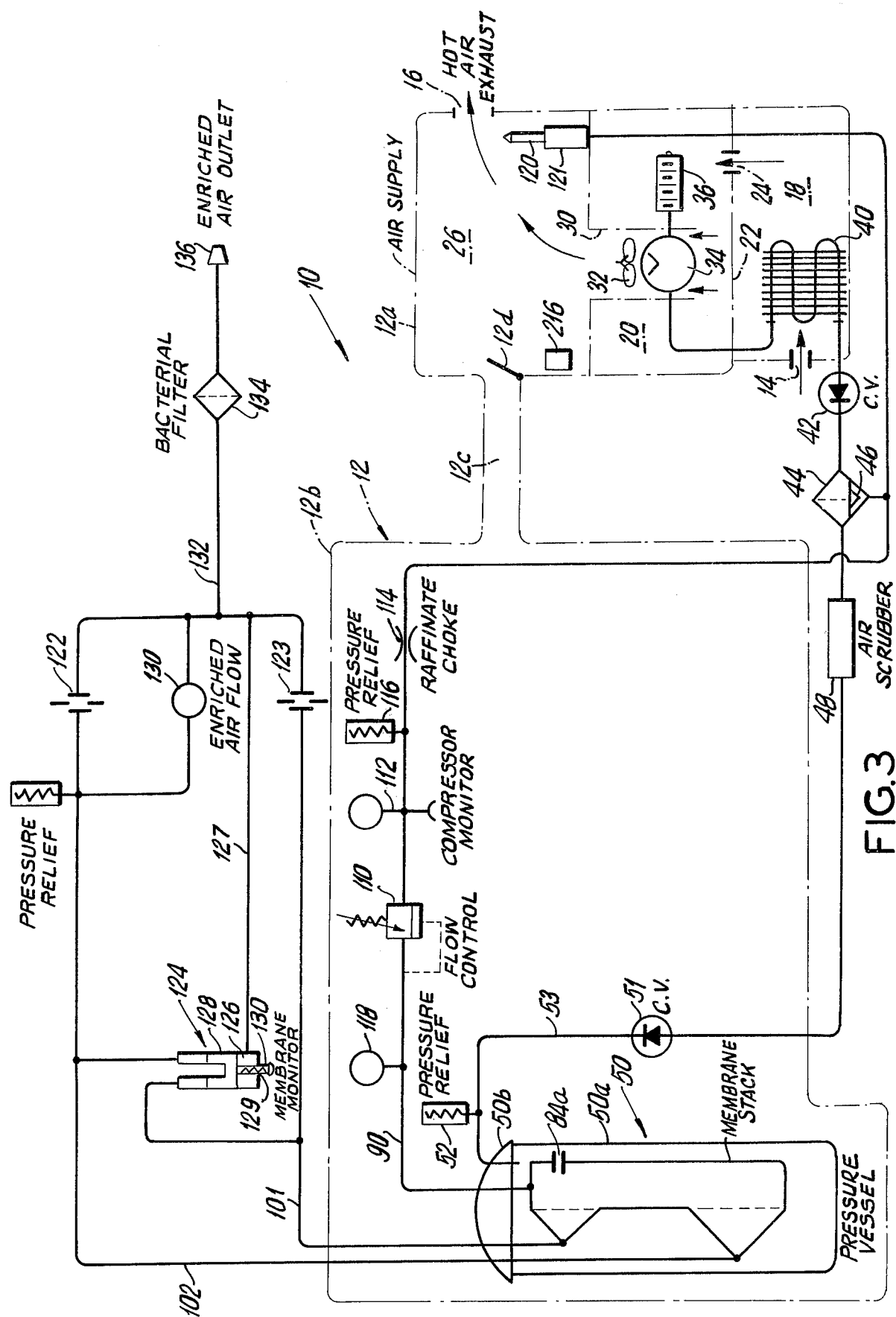
FIG. 3 illustrates in flow diagram form a preferred apparatus for carrying out the process of the present invention, the flow diagram comprising an oxygen enricher incorporating a split membrane array, and independent permeate output conduits containing restrictions, one being referenced against the other.

Stack 60 may be used in the embodiments illustrated in FIG. 1 or FIG. 3, or in any system in which it is desirable to monitor the stack to determine whether leakage between the cells has occurred. Although the membrane cells 61 and 62 are illustrated as being flat and rectangular in shape, it will be appreciated that other shapes including cylindrical and circular cells also may be utilized.

The flow diagram in FIG. 3 illustrates a total system, which will now be described to disclose a preferred embodiment.

In FIG. 3 is shown an oxygen enricher 10 in which atmospheric air is compressed and passed over an array of selectively permeable membranes which permit oxygen to permeate therethrough at a greater rate than nitrogen to provide a flow of oxygen enriched gas for inhalation by a patient. Enricher 10 includes a housing 12 which is formed by two box-like structures to form an air supply structure 12a and a pressure vessel structure 12b, which are in fluid communication with each other by means of a flow channel 12c. A one way flapper valve 12d is positioned in channel 12c to permit air to flow from structure 12b to 12a to cool the pressure vessel, described below.

Air supply structure 12a defines an atmospheric air intake port 14 and a hot exhaust port 16. The interior of structure 12a is subdivided into three chambers or regions including a cool air region 18, an intake region 20 separated from region 18 by a divider member 22, which is apertured at 24 to provide a flow path therebetween, and an exhaust chamber 26. Chamber 26 is separated from chamber 20 by means of a dividing wall 28 which forms an air passage 30 between the chambers. Atmospheric air is drawn through the air supply structure 12a by means of a fan 32 positioned within the structure, preferably within chamber 30.

A compressor 34 for producing the flow of compressed air for the enricher is positioned within chamber 20 and draws a supply of air through intake muffler 36 from the atmospheric air circulating through the air supply structure. Muffler 36 is designed to attenuate the noise level created by the compressor intake, preferably to less than 20 decibels, since the enricher is designed for use in the home and in close proximity to the patient. In addition to supplying the compressor with a source of air, it will be appreciated that the air circulating through the air supply structure provides a source of cooling air for the compressor. It will also be appreciated that a compressor having a fan mounted on its rotor may be used in place of separate fan 32 to circulate air through the structure.

Compressor 34 is designed to deliver a flow rate of from about 1.5 to about 1.7 cubic ft. per minute at 175 psi. The membrane cells in this embodiment are designed to deliver about 8 liters per minute of enriched gas containing about 40% oxygen when operating at 95°F. To remove the heat of compression from the compressed air, the compressed air is directed into an air fin heat exchanger 40 positioned in cool air chamber 18 so that the air entering through port 14 passes directly over the heat exchanger before entering the chamber 20. Heat exchanger 40 plus lowers the temperature of the compressed air to about 95°F. and also condenses water vapors which are present in the compressed air. After being cooled, the compressed air passes through a check valve 42 to a water vapor separator 44 in which the condensate is removed from the compressed air and held in the trap of the separator until a float 46 is raised and the condensate is delivered for vaporization, as described below.

After condensate has been separated from the compressed air, the air passes through a scrubber 48 which removes nitrogen dioxide and sulfur dioxide as well as other pollutants which might otherwise be enriched beyond ambient conditions by the selectively permeable membrane cells. The compressed air is then directed to a pressure vessel 50 through a check valve 51 and pressure relief valve 52 in line 53. A membrane stack 60 of the type shown in FIG. 2 is positioned in pressure vessel 50. Vessel 50 includes a generally U-shaped chamber portion 50a and a cover portion 50b which is in sealing engagement with portion 50a by means of a gasket and suitable clamping means (not shown) as is known in the art.

The system pressure is controlled by an adjustable relief valve 110 located in the raffinate line 90. Valve 110 may be a needle valve or any other type of valve with an adjustable orifice to control the flow rate by changing the pressure drop across the membrane stack. At a fixed temperature, the enriched air output from the membrane stack is directly proportional to the pressure differential across the membranes. Thus, raffinate flow measurement provides a means for accurately controlling oxygen enrichment without the need for a direct oxygen sensor. In this manner, by adjusting the flow rate at valve 110, the flow through the membrane stack and ultimately the oxygen enriched gas concentration may be controlled.

It has been found that when 25 liters per minute of compressed air at 95°F. and 175 psi are delivered to the membrane stack, the stack will produce oxygen enriched gas containing about 40% oxygen at the rate of 8 liters per minute. This enrichment results in the raffinate containing about 13% oxygen.

The raffinate flow is monitored by a combined pressure gauge and pneumatic switch 112 which are positioned upstream of a choke 114 in line 90. If the pressure in line 90 drops below the operating range of the stack, an electro-pneumatic switch 112 actuates an alarm system. Should the pressure in raffinate line 90 experience an excursion, a pressure relief valve 116 is provided to relieve the line. The pressure in line 90 upstream of control 110 also may be monitored visually by gauge 118.

The raffinate is carried by conduit 90 to an exhaust muffler 120 positioned within exhaust chamber 26 so that the oxygen depleted air is mixed with atmospheric air and discharged into the atmosphere through port 16. Condensate from separator 44 is directed into the raffinate line and carried along with the raffinate flow to a water evaporator 121 positioned within exhaust chamber 26, so that the water is evaporated to the atmosphere as the raffinate is discharged through muffler 120.

With further reference to FIG. 1, the split output of oxygen enriched gas carried by conduits 101 and 102 serves as the stack leak detector according to this invention by monitoring the flow ratio of the two groups of membrane cells. Leak detection is accomplished by comparing the pressure drops across orifices 122 and 123. Orifice 122 is a fixed cell group reference orifice and orifice 123 is an adjustable orifice which is initially matched to orifice 122 for given cell groups performance. In addition to monitoring the pressure drop ratio between orifices 122 and 123, the split cell group output is also utilized to measure the flow rate of the oxygen enriched gas, as explained above.

In FIG. 3, a preferred membrane cell group monitor can comprise a two-legged manometer 124 having a variable capacity reservoir 126 (e.g., bellows) so that the manometer may function as a combination differential and total pressure gauge. The variable capacity reservoir 126 contains a fluid 128 which is exposed to the pressure in the legs of the manometer and moves therein to provide a visual indication of the pressure and flow. The level of fluid 128 is set at a null point by means of a set screw 129. The bellows 126 is biased by a spring 130 to permit the reservoir to expand in volume in response to the total pressure in the manometer legs which are in fluid communication with conduits 122 and 123, respectively.

If the pressures in conduits 101 and 102 are equal the liquid level will depress according to the following equation:

$$\Delta h = \frac{\pi D^4 P}{8 d^2 R}$$

where
$D$ = reservoir diameter
$d$ = tube diameter
$P$ = pressure
$R$ = spring constant
$\Delta h$ = liquid depression An imbalance in the pressures in conduits 101 and 102 will result in a difference in liquid level in the legs of the manometer, and the average depression is a measure of total pressure.

In addition to the use of a manometer, a flow gauge 130 is also provided for determining the flow rate in one leg of the split stack which is proportional to the total output flow. Conduits 101 and 102 are joined to a single flow line 132 and passed through a bacteria filter 134 to a hose barb 136 on which a hose and associated inhalation mask may be secured. In this manner, oxygen enriched gas is delivered to a patient. To accommodate back pressure introduced into the output line 132, such as might be caused by the patient coughing into the face mask, a relief line 127 provides communication between line 132 and the exterior expansible boundary of reservoir 126 to balance the manometer during such periods so that the average liquid height is unaffected.

From the above description, it will be readily appreciated that a pressurized oxygen enricher is provided with efficient membrane leakage control and indicating means. Modifications thereto in addition to those described may be made by those skilled in the art without departing from the spirit and scope of the invention as pointed out in the claims. For example, the present split flow invention can also be used with a vacuum extract system such as that described in pending U.S. patent application Ser. No. 476,260 of Richard H. Blackmer and Jonathan W. Hedman, filed June 4, 1974, incorporated herein by reference.

I claim:

1. In a membrane permeation process to produce oxygen enriched gas from atmospheric air comprising delivering a flow of atmospheric air to an array of series flow, selectively permeable membrane cells having a greater permeability of oxygen relative to nitrogen and maintaining a pressure differential across said array to produce an oxygen enriched permeate therethrough, the improvement for controlling and detecting membrane failure comprising:
   i. dividing the selectively permeable membrane into two groups of cells;
   ii. independently collecting the oxygen-enriched permeate output from each of said groups of cells;
   iii. passing each collected permeate output through independent conduit means including means for restricting the flow of said oxygen enriched permeate output to initially produce zero pressure differential between each conduit means, said pressure being measured in each conduit means at a location upstream of the flow restricting means;
   iv. continuously determining the presence or absence of a pressure differential between said conduit means; and
   v. discontinuing the process when a pressure differential is determined to exist between the conduit means indicating a membrane leakage failure in one of the two groups of membrane cells.

2. A process as defined in claim 1 including the step of measuring the pressure differential across one of said restrictions whereby the total oxygen enriched permeate flow delivered in the process is determined.

3. A process as defined in claim 1 wherein the array comprises at least four cells and the two groups are provided by dividing alternate cells.

4. A process as defined in claim 1 wherein at least one of said restricting means is adjustable and the initial production of zero pressure differential between each conduit means is achieved by adjusting the respective restricting means.

5. A process as defined in claim 1 including the steps of compressing the atmospheric air and delivering it to the array of cells in a compressed state.

6. A process as defined in claim 1 including the steps of delivering the atmospheric air to the array of cells at substantially ambient pressure and maintaining a partial vacuum within said cells for independently collecting the oxygen-enriched permeate for transfer into said independent conduit means.

7. A process as defined in claim 1 wherein said cell array is adapted to provide enriched gas having about 40% oxygen.

8. A process as defined in claim 1 wherein said cell membranes are formed of a polyphenylene ether.

9. A process as defined in claim 8 wherein each of said membranes is about 1000 Angstroms in thickness.

10. A process as defined in claim 1 wherein the independent conduit means are adapted to deliver oxygen-enriched permeate for further use at a rate in the range of about 4 to 8 liters per minute.

* * * * *